United States Patent

[11] 3,559,784

[72] Inventor Donald L. Miller
Horseheads, N.Y.
[21] Appl. No. 746,523
[22] Filed July 22, 1968
[45] Patented Feb. 2, 1971
[73] Assignee The Bendix Corporation
a corporation of Delaware

[54] ELECTRIC OVERLOAD CLUTCH
5 Claims, 5 Drawing Figs.
[52] U.S. Cl. .................................................. 192/56,
192/84, 192/90
[51] Int. Cl. ................................................. F16d 43/20,
F16d 27/10
[50] Field of Search ...................................... 192/56, 90,
150, 84, 84(A), 84(C)

[56] References Cited
UNITED STATES PATENTS
1,989,984  2/1935  Hope .......................... 192/84(A)
2,741,352  4/1956  Stevens et al. .................. 192/56
2,875,876  3/1959  Rudisch ........................ 192/90(X)
2,881,891  4/1959  Birkland et al. ................ 192/56(X)
3,240,304  3/1966  Wickersham .................... 192/56
3,251,441  5/1966  Winter ........................ 192/90(X)

Primary Examiner—Allan D. Herrmann
Attorneys—William S. Thompson and Plante, Arens, Hartz and O'Brien ABSTRACT: An electromagnetic clutch having an overtorque triggered release which allows reengagement of the torque transmitting members without reducing clutch speed. When overload occurs, the initial slippage of the torque transmitting members cams them apart, reversing the spring-electromagnetic force balance to force the axially movable torque transmitting member away from the axially stationary torque transmitting member. Electrical switching means, sensitive to torque and speed, are also provided to change the state of current flow in the electromagnetic clutch.

ELECTRIC OVERLOAD CLUTCH

BRIEF SUMMARY OF THE INVENTION

One simple method of providing overload protection to rotary machinery is to include a slip clutch which will slip at a predetermined level of transmitted torque, permitting the two torque transmitting clutch elements to slip relative to each other. A disadvantage of this arrangement is that it produces wear between the slipping parts and it tends to transmit some torque while slipping, making it difficult to determine that an overload condition exists. Once determined, it then becomes necessary to turn off the prime mover to correct the condition.

Another straightforward solution is to use a sheer pin or toggle means which still permits rotation of the parts and wear until the machinery is shut down. This indicates clearly that an overload condition exists, but is undesirable in the amount of time and effort lost in replacement or resetting.

Another method, as disclosed in applicant's copending commonly assigned application Ser. No. 621,533 now Pat. No. 3,400,795, involves the use of a centrifugal switch triggered by the movement of a mass having an eccentric centroid. The mass is moved by the slippage of components and held in the "off" position by the relocation of its centroid. This arrangement again requires that the prime mover be switched off to allow the clutch to be reset.

In light of the foregoing, it is an object of the present invention to provide an electromagnetic clutch which provides overtorque protection by maintaining the torque transmitting clutch elements in a spaced-apart relationship subsequent to slippage to minimize wear. It is a further object of the present invention to provide such a clutch which can be reset without reducing the speed of the prime mover.

It is also an object of this invention to provide an electromagnetic clutch which is sensitive to critical overload and can rapidly disengage, but which is not subject to disengagement due to momentary or transient overloads or machinery vibration. It is an object of this invention to provide an electromagnetic clutch which is not subject to wear while an overload condition exists. The invention resides, more particularly, in the interrelation of the various component elements to achieve the beneficial results intended, namely, the provision of an electromagnetic clutch with adjustable maximum torque transmitting capabilities which does not transmit torque and does not wear during periods of possible overtorque transmission and which is reengageable while the input member is rotating at operating speed. Furthermore, these objectives are achieved in a configuration which permits the addition of electrical switching means which function at either an overtorque or overspeed occurrence.

Other and further objects and advantages of the present invention will be obvious to the man skilled in the art from the claims and appended drawing.

DETAILED DESCRIPTION

Figure 1:
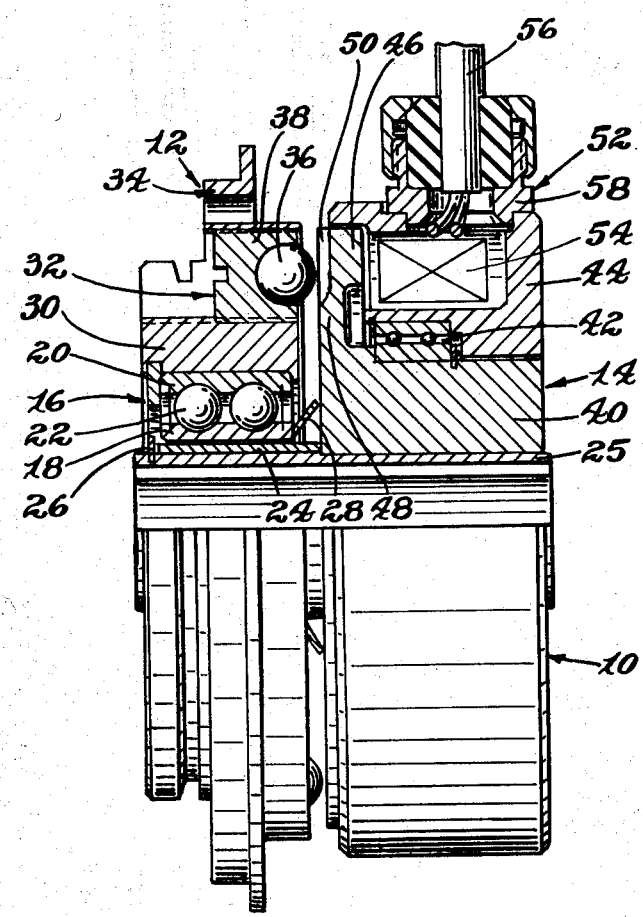
FIG. 1 shows, in partially broken away elevated section, one embodiment of the clutch made according to the present invention which has a stationary electromagnetic coil and which is coil engaged and spring released.

Referring now to FIG. 1, the clutch 10 according to the present invention, is shown. This clutch has first and second torque transmitting members, indicated generally by 12 and 14 respectively, either of which may be considered as the input member. For the sake of this description, it will be presumed that the second torque transmitting member 14 is the input element, and the first torque transmitting member 12 is the output element.

The first torque transmitting member 12 consists of a bearing 16, which has inner race 18 and outer race 20 and interconnecting balls 22. The inner race 18 is slidably mounted on a sleeve 24 for sliding movement between a fully disengaged position defined by lock ring 26 and the fully engaged position. The inner race 18, and consequently the first torque transmitting member 12, is resiliently biased toward the lock ring 26 by spring 28 which is shown here as a Belleville spring, but which may be any known type of spring. The outer race 20 is fixedly attached to a permeable ring element 30 which supports the disengagement triggering mechanism 32 and the output mechanism 34.

The disengagement triggering mechanism 32, has a projection which is shown as a ball 36 which, in turn, is rollably retained in a cup member 38. The position of the cup member 38, with respect to the permeable ring element 30, can be axially adjusted to vary the torque limit at which the disengagement triggering mechanism 32 functions. The output mechanism 34 may be a sprocket or may contain bolt attaching means or may be splined form for mesh with a complementary shaft. Since these constitute known forms, they need not be further discussed.

The second torque transmitting member 14 consists of a rotary member 40 which is fixedly attached to a shaft member 42 for rotation therewith and bearing 42 which interconnects the rotary member 40 with the stationary magnet body 44.

The rotary member 40 includes a radially extending portion 46 which consists of a thin web 48 and a projection receiving recess 50. The web 48 presents a high reluctance to electromagnetic flux which encourages the flux to cross the gap 38 to ring element 30. The recess 50 is adapted to retain the projecting portion of the ball 36, whenever there exists a torque exchanging condition. During engagement, the ball 36 is allowed to rotate freely in contact with the friction surface of the second torque transmitting member 14 until it is in registry with the recess 50 at which time the first and second torque transmitting members will rotate together.

Also shown in FIG. 1 are the stationary electromagnetic coil means, shown generally as 52, which include the coil 54, electrical leads 56, and the mounting member 58 which is in contact with the magnet body 44.

Figure 2:
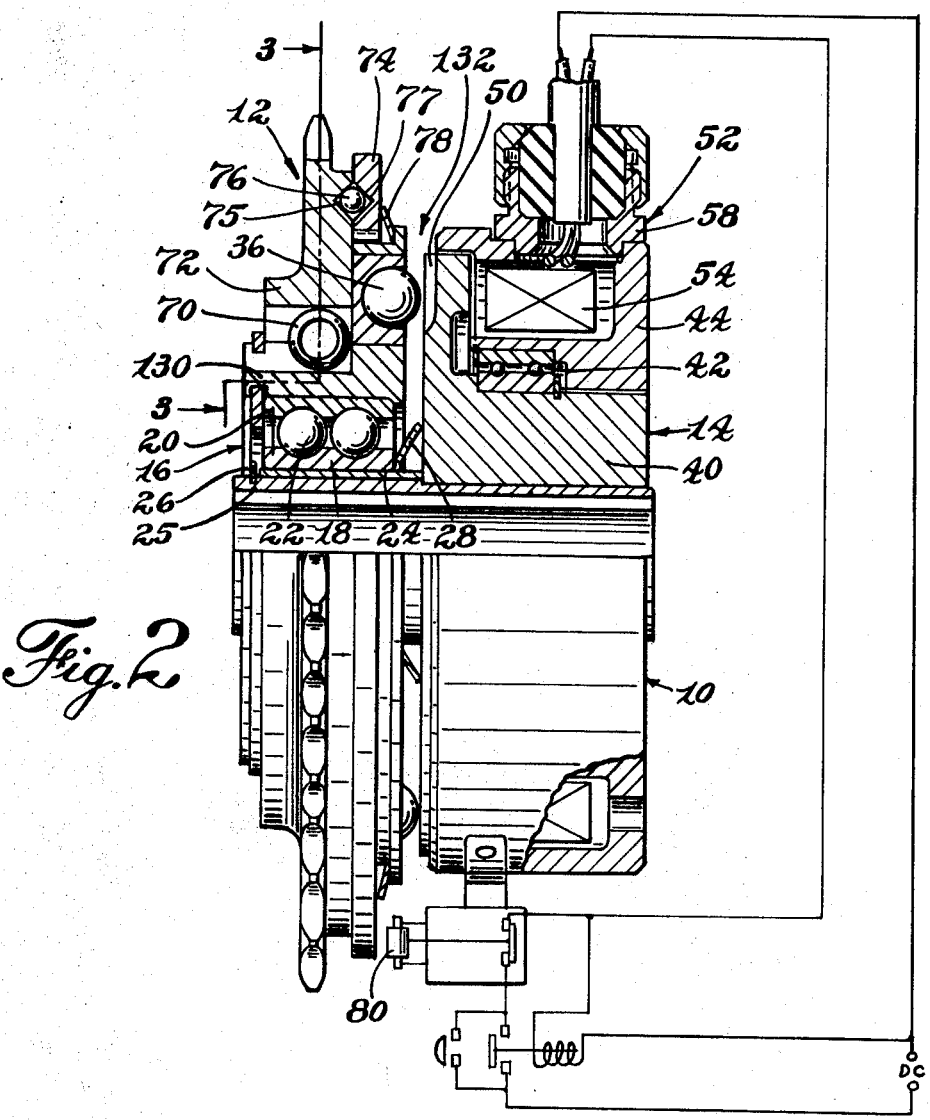
FIG. 2 shows, in partially broken away elevated section, an alternate embodiment of an electromagnetic clutch according to my invention having plural overtorque protection means and overspeed protection means.
Figure 3:
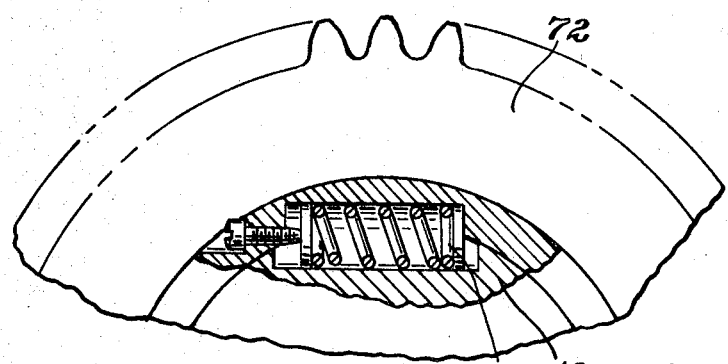
FIG. 3 shows, in partial section, taken along line 3—3 in FIG. 2, the adjustable spring mechanism which constitutes the second method of providing overtorque protection.

Referring now to FIGS. 2 and 3, additional overtorque protection is shown as well as the elements shown in FIG. 1. The second torque transmitting member 14 and the stationary electromagnetic means 52 remain unchanged, as does the structure radially inward of the outer race 20 of the bearing 16. In this embodiment, the outer race 20 is connected to a ring element 130 which supports two overtorque protective mechanisms. The first of these is similar to that of FIG. 1 embodiment and is identified generally by the numeral 132.

The second of these mechanisms consists of adjustable spring 70, sprocket ring 72, switch operating ring 74, ring moving elements 76 located in individual recesses 75 and 77 on sprocket ring 72 and switch operating ring 74 and bias spring 78. While the switch operating ring 74, disengagement triggering mechanism 132 and ring element 130 are interconnected for constant relative position, the sprocket element 72 is connected to the ring element 130 by spring 70, so that slight relative rotational movement is possible.

The operation of the disengagement triggering mechanism 32 and 132 of FIGS. 1 and 2 is as follows. Energization, in excess of the normal level, of the electromagnetic coil, as by providing current in excess of the rated coil current, will generate electromagnetic flux which will attract the first torque transmitting member 12 into engagement with the second torque transmitting member 14. The balls 36 will revolve in their respective sockets until they come into registry with the recesses 50. This will allow the two torque transmitting members 12 and 14, to come into abutting contact thereby reducing to zero the high reluctance air gap therebetween and establishing the torque exchanging relationship. From the FIGS. it should be apparent that less than a hemisphere of each ball 36 will be received in its corresponding recess, since only a portion of each ball less than a hemisphere is allowed to project beyond the face of the first torque transmitting member 12. When a torque exchanging relationship has been established, the trailing edge of the recess is in contact with the ball at a point which, if connected to the center of the ball, would establish a nonaxially, noncircumferentially extending line. As force is transferred between the torque transmitting members, along this line, a component of this force would tend to separate the torque transmitting elements. When this component becomes sufficiently large enough to overcome the electromagnetic attractive force, separation will occur with the spring force now being the dominant force. If the contact between the ball 36 and the recess 50 is a point contact, the first instant of slip will cause the point of contact to shift. This will result in the described line approaching the axially extending centerline of the ball. The result of this shift is that the force which tends to separate the two torque transmitting members rapidly increases, thereby accelerating the separation of the members. This release action is further assisted by the decrease in the electromagnetic force as the air gap increases.

For every change in the amount of ball projection or exposure, the angle between the described line and the axial direction, termed the ramp angle, will also change thus causing the axial component of separation to vary in a determinable manner. This allows easy calculation of the separation force as a function of transmitted force and amount of exposure so that maximum transmitted torque can be selected and set as a predetermined clutch characteristic.

The additional overtorque protective mechanism shown in FIG. 2 functions in basically the same manner except that overtorque produces a relative rotation between the sprocket ring 72 and the switch operating ring 74, which, due to the ball or balls 76, causes axial movement of the switch operating ring 74 into contact with switch 80 which interrupts current flow to the coil 54. This permits the spring 28 to cause disengagement of the torque transmitting members 12 and 14 as the electromagnetic force falls to zero. These balls 76 may also serve to perform the same switching function in the event of overspeed since the recesses 75 and 77 in which they are carried, may include a radial, as well as a circumferential, profile so that excess speed will increase the centrifugal force acting on the balls 76 and will tend to separate the sprocket ring 72, and the switch operating ring 74.

In the FIG. 2 embodiment, I have shown the protective feature of the disengagement triggering mechanism 132 for those situations in which the overload is so sudden or severe that the torque exchanging members 12 and 14 are unable to separate before the overload is transmitted to associated machinery. In such an application, the disengagement triggering mechanism 132 would be adjusted to operate at a torque transmitting level slightly above that set for the spring 70 and yet low enough to prevent equipment damage. This would also be applicable in mechanical processing operations, such as mail sorting, wherein the items being processed might become jammed and create an overtorque situation. While this might not cause damage to any associated machinery, the item could easily be destroyed unless disengagement of the clutch were immediate, regardless of the circumstances which prompted disengagement.

Figure 4:
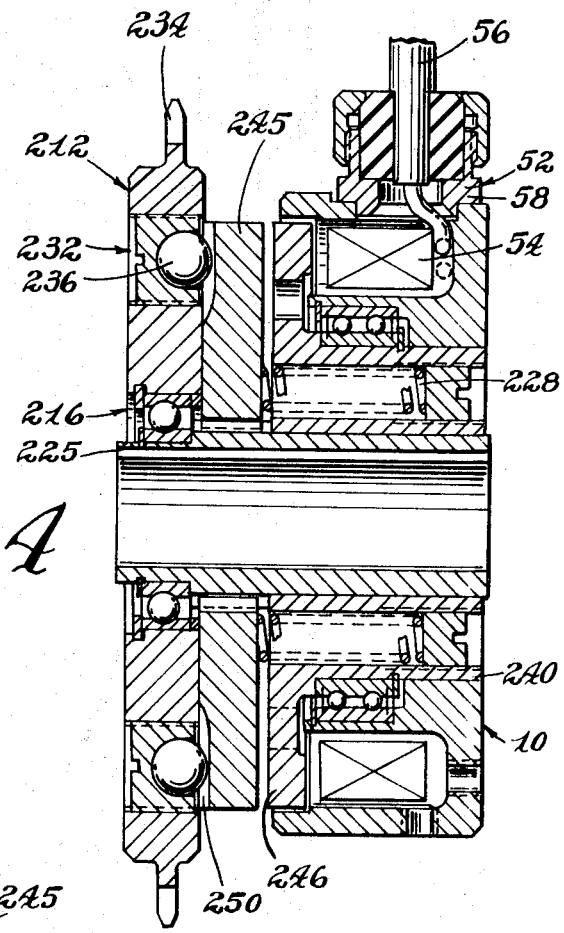
FIG. 4 shows, in elevated section, another embodiment of my invention with this clutch being spring engaged and coil released.

Referring now to FIG. 4, an alternative embodiment of my invention is shown in which the clutch may be described as a stationary coil electromagnetically released spring engaged clutch. For ease of reference, similar components will have similar numbers, but in the 200 series of numbering.

The first torque transmitting member 212 includes output means in the form of sprocket 234, an adjustable disengagement triggering mechanism 232, and connecting bearing 216. The inner race of the connecting bearing 216 is attached to the shaft 225 for rotation therewith.

Armature 245 is slidably splined to the shaft 225 and is biased into engagement with the first torque transmitting member 212 by adjustable spring 228. When overtorque slip occurs, the armature 245 is forced into proximity with the radially extending portion 246 of the rotary member 240 greatly reducing the high reluctance air gap therebetween to the point that the force generated across the gap by electromagnetic flux is sufficient to overcome the spring force and complete the disengagement, by drawing armature 245 into contact with rotary member 240 along its radially extending portion 246.

Figure 5:
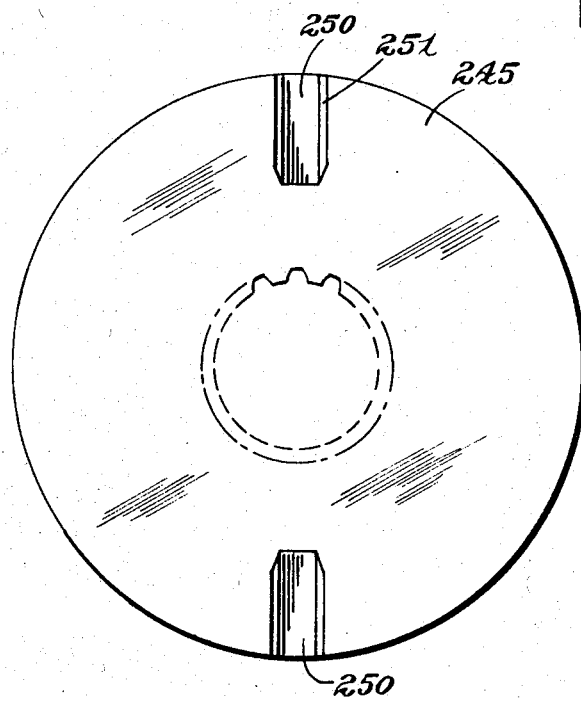
FIG. 5 shows one of the contact surfaces of a clutch according to my invention having two concavities for selective clutch engagement in either of two positions.

FIG. 5 shows the armature 246 and the recesses 250. As a further feature, these recesses 250 are shown as having ramp surfaces 251 instead of squared sides. This provides a degree of stability for the clutch in that the clutch becomes less sensitive to momentary or transient overloads and to operating vibrations without jeopardizing overtorque protection. When the clutch is operating near to its torque limit, any overtorque condition must last sufficiently long for the balls to ride up the ramp surface which should then eliminate the possibility of a momentary overtorque condition triggering disengagement as would be likely if the recesses 250 had squared sides. This feature is, of course, equally applicable to the clutch of my FIGS. 1 and 2 embodiments as it is to the clutch in my FIG. 4 embodiment.

The armature 245 is shown as having two recesses which are used to provide selective engagement in two positions 180° apart. This forms no part of my invention, and there may be any number of recesses, just as there may be any number of projection recess pairs in any pattern desired.

In each of the embodiments shown, the electromagnetic coil means 52 remains normally energized throughout the operating cycle. This permits the proper action to occur in the event of an overtorque situation. In the spring engaged embodiment, momentary interruption in the flux, as by turning off the exciting current, will permit clutch engagement, while momentary overexcitation, as by increased current flow to the coil 54, will draw the clutch into engagement in the spring released embodiments.

I claim:

1. An overload protection clutch comprising:

first and second rotational torque transmitting members axially aligned relative to each other;

said torque transmitting members mutually engageable to transmit torque;

said first torque transmitting member biased towards a first axial position by resilient means;

normally energized electromagnetic coil means arranged in close proximity to said first torque transmitting member to attract said first torque transmitting member to a second axial position;

magnet body means adapted to receive and retain said electromagnetic coil means;

one of said first and second axial position constituting the fully engaged position and the other of said first and second positions constituting the fully disengaged position;

said electromagnetic coil means and said resilient means arranged to provide a predominantly spring force in one of said axial positions and a predominantly electromagnetic force in the other of said positions, said forces being mutually opposed;

disengagement triggering means operative upon overload to move said first torque transmitting member from the engaged position toward the disengaged position such that the force relationship of the spring and electromagnetic forces reverses and the dominating force completes the disengagement; and said disengagement triggering means consist of projections on the contact surface of one of said torque transmitting members and corresponding recesses on the contact surface of the second of said torque transmitting members.

2. An overload protection clutch as claimed in claim 1 wherein said electromagnetic coil means being operative on overenergization to attract said first torque transmitting member into engagement with said second torque transmitting member.

3. An overload protection clutch as claimed in claim 1 wherein said resilient means are adjustable to vary the amount of torque transmitted by said torque transmitting members.

4. An overload protection clutch as claimed in claim 1 wherein said projection are balls and said recesses have, in profile, a predetermined ramp angle operative to transmit torque between said torque transmitting members during a period of slight or transitory overload prior to slip.

5. An overload protection clutch as claimed in claim 4 wherein said balls are rotatably fixed in sockets which are adjustable to vary the depth of penetration into the concavities.